United States Patent [19]

Rogers et al.

[11] Patent Number: 5,520,897
[45] Date of Patent: *May 28, 1996

[54] METHOD OF REAGENT AND OXIDATION AIR DELIVERY

[75] Inventors: Kevin J. Rogers, Wadsworth; Dennis W. Johnson, Barberton, both of Ohio

[73] Assignee: The Babcock & Wilcox Company, New Orleans, La.

[*] Notice: The term of this patent shall not extend beyond the expiration date of Pat. No. 5,500,196.

[21] Appl. No.: 359,147

[22] Filed: Dec. 19, 1994

Related U.S. Application Data

[63] Continuation-in-part of Ser. No. 107,387, Aug. 16, 1993.
[51] Int. Cl.$^6$ ............................ B01D 53/50; B01D 53/79
[52] U.S. Cl. .................. 423/242.1; 423/243.01; 423/243.03; 423/243.05; 423/243.08
[58] Field of Search .................. 423/242.1, 243.01, 423/243.03, 243.05, 243.06, 243.08, 244.01, 244.07, 242.3; 95/93, 105, 137; 34/359

[56] References Cited

U.S. PATENT DOCUMENTS

| | | | |
|---|---|---|---|
| 3,632,306 | 1/1972 | Villiers-Fisher | 23/2 SQ |
| 4,102,056 | 7/1978 | Angelo et al. | 34/10 |
| 4,409,192 | 10/1983 | Lichtner et al. | 423/242 |
| 4,454,101 | 6/1984 | Garrison et al. | 423/242 |
| 4,728,342 | 3/1988 | Abom | 55/59 |
| 5,082,639 | 1/1992 | Lee et al. | 423/242 |
| 5,168,065 | 12/1992 | Jankura et al. | 436/55 |
| 5,302,188 | 4/1994 | Neal et al. | 95/34 |

FOREIGN PATENT DOCUMENTS

| | | | |
|---|---|---|---|
| 0137599 | 4/1985 | European Pat. Off. | 53/34 |
| 2928061 | 1/1979 | Germany | 53/14 |
| 3317505A1 | 11/1984 | Germany | 19/4 |
| 3446390 | 6/1986 | Germany | 423/242.3 |
| 51-59774 | 5/1976 | Japan | 423/242.3 |
| 54-11891 | 1/1979 | Japan | 13 O F27 |
| 479630 | 6/1937 | United Kingdom | 423/242.3 |
| 2234232 | 1/1991 | United Kingdom | 423/242.3 |

OTHER PUBLICATIONS

"Gas Purification" 2nd edition by Riesenfeld and Kohl, Gulf Publishing Co., Houston TX 1974, pp. 278–279, 317–320, 323–325, 334–338, 367 and 396–397.

"Acid Rain Compliance—Advanced Co–Current Wet FGD Design For the Bailly Station", Wrobel et al., Nov. 1992, First Annual Clean Coal Technology Conference Proceedings Cleveland, Ohio 22–24 Sep. 1992.

Burker, Stohs (Radian Corp.); Price (Associated Electric Cooperative, Inc.); and Moser (Electric Power Research Institute), "Results of Sodium Formate Addition Tests at EPRI's High Sulfur Test Center and Associated Electric Cooperative's Thomas Hill Unit 3 FGD System", Proceedings of the 1990 $SO_2$ Control Symposium, vol. 2: Sessions 4B, 4C, 5, and 6A, New Orleans, LA. Sponsored by the Electric Power Research Institute, Palo Alto, CA. Confernce Date: May 8–11, 1990. Publication Date: Sep. 1990. Entire Paper.

Burke (Radian Corp.); Cmiel (San Miguel Electric Cooperative); and Mobley (Air and Energy Engineering Research Laboratory), "Results of Using Organic Acid in San Miguel Electric's Flue Gas Desulfurizatino System". Presented at EPA/EPRI Symposium on Flue Gas Desulfurization in Cincinnati, OH, Jun. 4–7, 1985. Entire Paper.

(List continued on next page.)

Primary Examiner—Gary P. Straub
Assistant Examiner—Timothy C. Vanoy
Attorney, Agent, or Firm—Robert J. Edwards; Eric Marich

[57] ABSTRACT

A method of forced oxidation flue gas desulfurization uses an oxidation air system air stream to not only provide oxidation air into an absorber vessel, but also to pneumatically convey and inject dry reagent into the absorber vessel to satisfy reagent addition requirements. If necessary, other dry additives can be added to the dry reagent so that the oxidation air stream injects both the dry reagent and the dry additives into the absorber vessel. The dry additives can be added in this method even if the reagent is introduced by other known methods.

17 Claims, 1 Drawing Sheet

OTHER PUBLICATIONS

Ellis, II and DeBerry (Radian Corporation), "Preliminary Study of Effects of Additive Additions on Four FGD Scrubber Alloys", Proceedings of the 1990 $SO_2$ Control Symposium, vol. 2: Sessions 4B, 4C, 5, and 6A, New Orleans, LA. Sponsored by the Electric Power Research Institute, Palo Alto, CA. Conference Date: May 8–11, 1990. Publication Date: Sep. 1990. Entire paper.

Rochelle and King, (Dept. of Chemical Engineering, University of California, Berkeley, CA) "The Effect of Additives on Mass Transfer in $CaCO_3$ or CaO Slurry Scrubbing of $SO_2$ from Waste Gases", *Ind. Eng. Chem. Fundam.*, vol. 16, No. 1, 1977. pp. 67–75.

Rochelle (Department of Chemical Engineering, Unviersity of Texas at Austin), "Buffer Additives for Limestone Scrubbing: A Review of R&D Results", pp. 376–399. Presented at 1982 EPA/EPRI $SO_2$ Control Symposium, Hollywood, FL, May 17–20, 1982, Sponsored by the Electric Power Research Institute, Palo Alto, CA, EPRI Report CS 28971, published 1983.

Stohs and Carey (Radian Corp.) and Owens (Electric Power Research Institute), "Development of a Predictive Model for Organic Acid Consumption in Wet Limestone FGD Systems". Presented at 1993 $SO_2$ Control Symposium, Aug. 24–27, 1993, Boston, MA. Entire Paper.

Nischt, Johnson and Milobowski (Babcock & Wilcox), "Selection Considerations for Controlled Oxidation Wet FGD". Presented at 1993 $SO_2$ Control Symposium, Aug. 24–27, 1993, Boston, MA. Entire Paper.

Moser (Electric Power Research Institute) and Colley, Noblet & Jones (Radian Corp.), "Control and Reduction of Gypsum Scale in Wet Lime/Limestone FGD Systems by Addition of Thiosulfate: Summary of Field Experiences", Proceedings: First Combined Flue Gas Desulfurizaton and Dry $SO_2$ Control Symposium, St. Louis, MO, Oct. 25–28, 1988, Sponsored by Electric Power Research Institute, Palo Alto, CA and Radian Corp., Research Triangle Park, NC, Published Apr. 1989. Entire Paper.

Moser and Owens (Electric Power Research Institute), "Overview on the Use of Additives in Wet FGD Systems". Taken from *Proceedings: 1991 $SO_2$ Control Symposium*, Washington, DC, Dec. 3–6, 1991, Published Nov. 1992. Electric Power Research Institute, TR–101054S, vols. 1–3, 1991. Entire Paper.

METHOD OF REAGENT AND OXIDATION AIR DELIVERY

This is a continuation-in-part of application Ser. No. 08/107,387 filed Aug. 16, 1993.

FIELD AND BACKGROUND OF THE INVENTION

The present invention relates in general to wet flue gas desulfurization (FGD) processes and, in particular, to wet limestone forced oxidized flue gas desulfurization processes (LSFO-FGD) processes and other compatible processes. Wet LSFO-FGD systems have separate oxidation air and limestone slurry streams. These systems, in general, utilize a wet grinding circuit by grinding coarse limestone to prepare a limestone solids-liquid slurry as the fresh reagent supplied to the absorber system. Typically, wet ball mills have been used for this purpose. The wet comminution process has the advantage of potentially lower horsepower requirements than dry grinding processes, and the fact that the end product after grinding is a slurry also fits in well with the wet LSFO-FGD system design. This slurry is commonly stored in a holding tank to provide surge capacity for subsequent controlled supply to the absorber vessel based on demand.

In wet FGD systems, the sulfur dioxide ($SO_2$) absorption process requires a nearly continuous supply of fresh reagent to maintain satisfactory operation and $SO_2$ removal efficiencies. Often it is desirable to incorporate air addition to the wet FGD absorber to provide in situ forced oxidation of the absorber reaction product.

Providing separate oxidation air and limestone slurry streams increases the complexity and expense of these wet LSFO-FGD systems. It is thus apparent that an approach to providing these separate functions in a simple and cost-effective manner would be welcomed by the industry.

SUMMARY OF THE INVENTION

The fundamental nature of the present invention is the use of the oxidation air system air stream to not only provide oxidation air to an absorber vessel, but also to both pneumatically convey and inject dry reagent into the absorber vessel to satisfy reagent addition requirements.

Accordingly, one aspect of the present invention is drawn to a method of forced oxidation flue gas desulfurization wherein dry reagent and dry additive are supplied to an absorber vessel containing a liquid slurry through an oxidation air addition system. The method comprises the steps of: providing a rate controlled feed supply of prepared dry reagent and dry additive to a pneumatic conveying pick-up point located within air supply piping used to provide an oxidation air stream from the oxidation air addition system into the absorber vessel; and using the oxidation air addition system air stream to provide oxidation air into the absorber vessel, and to pneumatically convey and inject the dry reagent and dry additive into the absorber vessel sufficient to partially desulfurize flue gas provided to the absorber vessel.

The dry reagent is a member selected from the group consisting of solid alkali compounds used in flue gas desulfurization processes including limestone, calcium, potassium, aluminum, sodium, and/or ammonium compounds. Other dry additives besides reagent can be added separately or added to the dry reagent so that the oxidation air stream injects both the dry reagent and the dry additives into the absorber vessel. These additives could be added to promote oxidation within the absorber vessel; to enhance chemical absorption of the $SO_2$ within the absorber vessel or to provide a desired degree of buffering to the desulfurization process therein; to inhibit scale growth within the absorber vessel; or to promote or specify the type of or degree of crystallization, etc., in the desulfurization process occurring within the absorber vessel.

Accordingly, another aspect of the present invention is drawn to a method of forced oxidation flue gas desulfurization, wherein dry additive is pneumatically supplied to an absorber vessel containing a liquid slurry through an oxidation air addition system. The steps of this method comprise: providing a rate controlled feed supply of prepared dry additive to a pneumatic conveying pick-up point located within air supply piping used to provide an oxidation air stream from the oxidation air addition system into the absorber vessel; and using the oxidation air addition system air stream to provide oxidation air into the absorber vessel, and to pneumatically convey and inject the dry additive into the absorber vessel.

The various features of novelty which characterize the invention are pointed out with particularity in the claims annexed to and forming a part of this disclosure. For a better understanding of the invention, its operating advantages and specific results attained by its uses, reference is made to the accompanying drawings and descriptive matter in which a preferred embodiment of the invention is illustrated.

DESCRIPTION OF THE PREFERRED EMBODIMENT

Figure 1:
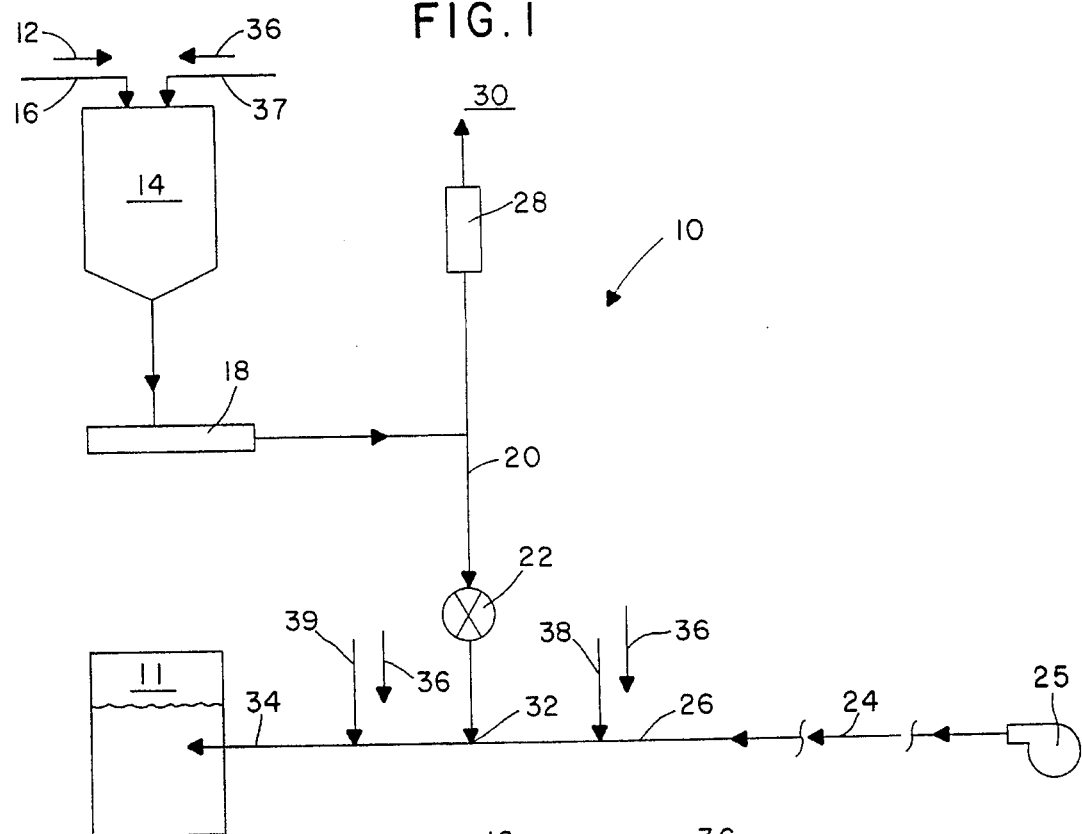
FIG. 1 is a schematic illustration of a system according to a first embodiment of the present invention.

In the drawings, like numerals designate the same or similar elements throughout the two drawings. Referring to FIG. 1 in particular, one aspect of the present invention is drawn to a system 10 using a method of forced oxidation flue gas desulfurization, wherein dry reagent is supplied to an absorber vessel, schematically shown at 11, through an oxidation air addition system. A properly prepared reagent 12 in a dry form is transported to a reagent surge bin 14, either by mechanical conveyance, or by dilute or dense phase conveyance, through a supply line 16. The dry reagent 12 is withdrawn from the surge bin 14 at a controlled rate by feeder means 18, such as a volumetric or gravimetric feeder. The controlled feed rate of dry reagent 12 corresponds to an absorber reagent demand required by the absorber vessel 11. The feeder means 18 discharges to a gravity flow chute 20 which directs the dry reagent 12 to an airlock 22. The airlock 22 provides the required level of isolation between the gravity flow chute 20 and an oxidation air stream 24 provided from oxidation air supply means 25, such as a blower or compressor station, at a higher pressure via oxidation air line supply piping 26. Oxidation air 24 which leaks across the airlock 22 can be vented through a vent filter 28 and into the atmosphere 30. Dry reagent 12 which passes through the airlock 22 is introduced to the oxidation air line 26 at a solid pneumatic conveying pick-up point 32, incorporated within the air line supply piping 26 used to provide the oxidation air stream 24 into the absorber vessel 11. The oxidation air stream 24 subsequently provides oxidation air to the absorber vessel 11, and pneumatically conveys and injects the dry reagent 12 to the absorber vessel 11 through line 34 to partially or completely satisfy the reagent addition requirements.

The dry reagent 12 is a member selected from the group consisting of solid alkali compounds used in flue gas desulfurization processes such as limestone, calcium, potassium, aluminum, sodium, and/or ammonium. Dry additives 36 can be added to the dry reagent 12 into the surge bin 14 by mechanical conveyance, or by dilute or dense phase conveyance, through dry additive supply line 37, so that the oxidation air stream 24 injects both the dry reagent 12 and the dry additives 36 into absorber vessel 11. The dry additives 36 could also be added separately into the oxidation air stream 24 at the same pneumatic conveying pick-up point 32, or at upstream or downstream dry additives pneumatic conveying pick-up points 38, 39 respectively. Various dry additives 36 could be added to promote oxidation within the absorber vessel 11; to enhance chemical absorption of the $SO_2$ within the absorber vessel 11 or to provide a desired degree of buffering to the desulfurization process therein; to inhibit scale growth within the absorber vessel 11; or to promote or specify the type of or degree of crystallization, etc., in the desulfurization process occurring within the absorber vessel 11. The dry additives can be added in this method even if the reagent is introduced by other known methods.

Examples of dry additives 36 which could be added to promote oxidation within the absorber vessel 11 include compounds of iron, manganese, vanadium and other metals that promote or catalyze oxidation.

Examples of dry additives 36 which could be used to enhance chemical absorption of the $SO_2$ within the absorber vessel 11 include magnesium oxide, ammonium hydroxide, sodium carbonate, sodium sulfite, sodium hydroxide, magnesium sulfite, and other soluble alkali compounds of magnesium, ammonium, potassium, calcium, and sodium, used to enhance absorption in a calcium (limestone or lime) based FGD system.

Examples of dry additives 36 which could be used to provide a desired degree of buffering to the desulfurization process occurring within the absorber vessel 11 include sodium formate, dibasic acid (DBA), sodium citrate, adipic acid, succinic acid, and other organic acids and/or their solid compounds including formic, acetic, hydroxypropionic, sulfosuccinic, adipic, phthalic, benzoic, fumaric, hydroxyacetic, succinic, and lactic.

Examples of dry additives 36 which could be used to inhibit oxidation to reduce scale growth within the absorber vessel 11 include compounds of formate and thiosulfate and elemental sulfur.

An example of a dry additive 36 which could be used to promote or specify the type of or degree of crystallization, etc. in the desulfurization process occurring within the absorber vessel 11 is polysulfonate.

As the examples listed above indicate, some of the various dry additives 36 can promote more than one kind of desired activity within the absorber vessel 11. For example, sodium formate has been shown to inhibit oxidation and provide formate ions to buffer and promote $SO_2$ removal in calcium based FGD systems. Also, additives such as iron EDTA can be used to promote removal of nitrous oxides in a flue gas desulfurization system. It will also be appreciated that more than one dry additive 36 could be employed at the same time, i.e., two or more dry additives 36 could be pneumatically injected into the absorber vessel 11 via the oxidation air addition system, so long as the two or more dry additives do not produce an adverse chemical reaction therebetween, or upon the desulfurization process occurring within the absorber vessel 11. By way of example and not limitation, the dry additives sodium formate and sodium thiosulfate, or calcium carbonate and DBA, could be pneumatically injected simultaneously without adverse effect. However, combinations of iron and thiosulfate, or sodium formate and DBA for example, would not be desirable because the first combination represents opposing goals of promoting and inhibiting oxidation while the second is not desirable because the two additives are used to accomplish the same goal of buffering.

While the solids pick-up point 32 can be located at virtually any point in the line 26 downstream of the oxidation air supply means 25, it is preferable to locate it as close to the absorber vessel as practical. This will minimize the length of line 34 and the associated additional pressure drop and abrasive wear due to the solids conveying function. Similar location considerations would apply to any separate dry additives 36 pneumatic conveying pick-up points 38, 39. Minimizing the number of bends and line direction changes in line 34 will also serve this end.

Multiple system design configurations and arrangements are also possible. Through the use of the present invention, each individual overall FGD system design may be adapted for use with the present invention, even uniquely designed and engineered arrangements, equipment selections, and configurations. An example of one such variation is illustrated in FIG. 2.

Figure 2:
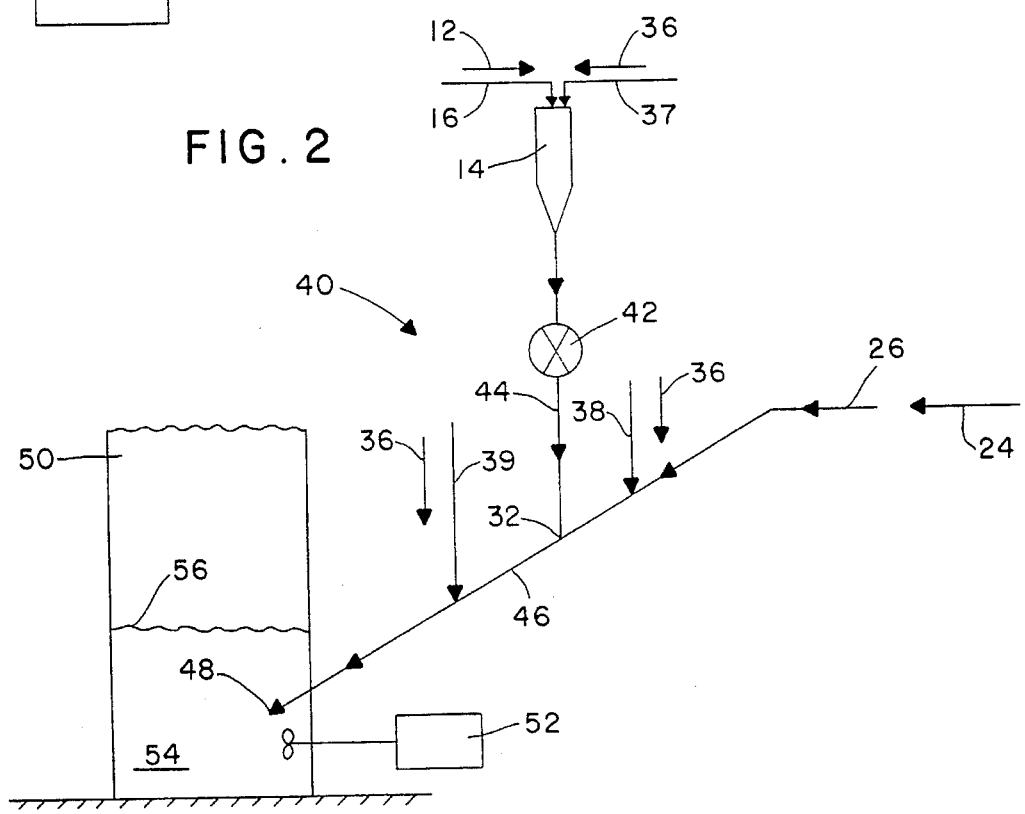
FIG. 2 is a schematic illustration of a system according to a second embodiment of the present invention.

Referring to FIG. 2, the system 40 receives dry reagent 12 through line 16, either by mechanical conveyance, or by dilute or dense phase pneumatic conveyance, in order to be stored in surge bin 14. A rotary airlock/feeder 42 provides both the airlock and feed rate control function to supply the dry reagent 12 through chute 44 to oxidation air line 26 at pick-up point 32. The solids and air mixture is then conveyed directly through a straight run of pipe 46 to an injection point or points 48 located within an absorber reaction tank or vessel 50. Branches or multiple arrangements can be configured in order to increase the quantity of injection points 48 as required by the FGD process. If desired, injection point or points 48 can terminate in a vicinity of a primary flow discharge from a mechanical agitator 52, for dispersion of both oxidation air stream 24 and reagent 12 into the absorber reaction tank or vessel 50. To facilitate other possible arrangements, the reagent flow control function could be provided remotely, whereby the dry reagent 12 is either dilute or dense phase pneumatically conveyed, from a remote location, directly to the oxidation air line 26 solids pick-up point 32 at the desired rate. This would allow the feed rate of the dry reagent addition into the absorber vessel 50 and the feed rate of the oxidation air stream into the absorber vessel 50 to be independently controlled. In either case, the oxidation air line 26 solids pick-up point 32 should be provided at an elevation above a slurry liquid level 56 in absorber reaction tank 50, so that if the air supply means 25 fails, the slurry 54 will not back-up into the equipment piping 26, 44 located at or above the elevation corresponding to the liquid level 56. Additionally, a minimum feed rate of the oxidation air stream 24 would usually be supplied whenever the feed rate of the dry reagent 12 is greater than zero, to prevent solids dropout in the piping 26, 46.

Variations in the dispersing means 52 used to disperse the solids-air mixture into the slurry 54, such as by the use of modified sparge headers, injection lances, jet mixers/aerators, etc., can also be applied as deemed applicable to the overall process.

The process according to the present invention can reduce overall plant capital costs by incorporating portions of the fresh reagent feed functions and the oxidation air addition functions into a single piping system. If a dry grinding system is required on site, it might draw more power then a comparable wet grinding system. However, this could be off-set by the lack of recycle water piping from a dewatering system to a reagent preparation system, reduced recycle water pump sizes, increased slurry solids densities throughout the plant and by the lowering of hydraulic loadings throughout the plant.

The present invention allows increased FGD performance in the absorber reaction tank 50 due to a higher slurry solids density. The present invention also eliminates the need for fresh slurry feed pumps and associated slurry supply loops.

Additionally, the present invention provides for a reduction in the size of the fresh reagent surge storage vessel; it also eliminates the potential for reagent powder carryover from the absorber reaction tank 50 since the reagent is introduced below the liquid level 56 therein, rather than elsewhere within the absorber reaction tank 50.

The invention can be used to effectively introduce a wide variety of reagents into the absorber, such as the primary alkaline reagent, as well as various dry additives such as oxidation promoters, buffering agents, etc. Accordingly, while a specific embodiment of the invention has been shown and described in detail to illustrate the application of the principles of the invention, it will be understood that the invention may be embodied otherwise without departing from such principles. Such embodiments have been omitted herein for the sake of conciseness and readability but properly fall within the scope of the following claims.

We claim:

1. A method of forced oxidation flue gas desulfurization, wherein dry reagent and dry additive are pneumatically supplied to an absorber vessel containing a liquid slurry through an oxidation air addition system, comprising:

providing a rate controlled feed supply of prepared dry reagent selected from the group consisting of solid alkali compounds used in flue gas desulfurization processes including calcium, potassium, aluminum, sodium and ammonium compounds and dry additive used to promote at least one of the functions selected from the group consisting of promoting oxidation, enhancing chemical absorption of $SO_2$ from the flue gas provided to the absorber vessel, providing buffering and promoting crystallization to a pneumatic conveying pick-up point located within air supply piping used to provide an oxidation air stream from the oxidation air addition system into the absorber vessel;

controlling a feed rate of the dry reagent to the pneumatic conveying pick-up point independently of a feed rate of the oxidation air stream into the absorber vessel;

using the oxidation air addition system air stream as the sole means of providing oxidation air oxidation air into the absorber vessel, and to pneumatically convey and inject the dry reagent and dry additive into the absorber vessel to at least partially desulfurize flue gas provided to the absorber vessel; and injecting the oxidation air stream, the dry reagent, and the dry additive beneath a liquid surface level of the liquid slurry within the absorber vessel.

2. The method according to claim 1, wherein the dry reagent injected into the absorber vessel via the oxidation air addition system is sufficient to completely desulfurize flue gas provided to the absorber vessel.

3. The method according to claim 1, further including the step of adding the dry additive to the dry reagent so that the oxidation air stream injects both the dry reagent and the dry additive into the absorber vessel.

4. The method according to claim 1, further including the step of providing a minimum feed rate oxidation air stream whenever the feed rate of the dry reagent is greater than zero, to prevent solids dropout in the air supply piping.

5. The method according to claim 1, further including the step of pneumatically conveying the dry reagent to the pneumatic conveying pick-up point located within the air supply piping.

6. The method according to claim 1, further including the step of injecting the dry reagent and the dry additive into the absorber vessel in the vicinity of a dispersion means to enhance dispersion of the oxidation air stream, the dry reagent, and the dry additive within the liquid slurry contained within the absorber vessel.

7. The method according to claim 1, wherein the dry additive is added in catalytic amounts to promote oxidation within the absorber vessel and is a member selected from the group consisting of compounds of iron, manganese, and vanadium.

8. The method according to claim 1, wherein the reagent is lime or limestone and the dry additive is a member selected from the group consisting of alkali compounds of magnesium, ammonium, potassium, calcium, and sodium.

9. The method according to claim 1, wherein the dry additive is a buffering agent for the desulfurization occurring within the absorber vessel and is a member selected from the group consisting of sodium formate, dibasic acid (DBA), sodium citrate, adipic acid, succinic acid, and solid compounds of formic, acetic, hydroxypropionic, sulfosuccinic, adipic, phthalic, benzoic, fumaric, hydroxyacetic, succinic, and lactic acid.

10. The method according to claim 1, wherein the dry additive is a member selected from the group consisting of compounds of formate and thiosulfate and elemental sulfur.

11. The method according to claim 1, wherein the dry additive is polysulfonate.

12. A method of forced oxidation flue gas desulfurization, wherein dry additive is pneumatically supplied through an oxidation air addition system to an absorber vessel containing a liquid slurry, comprising:

providing into the absorber vessel at least one reagent selected from the group consisting of solid alkali compounds used in flue gas desulfurization processes including calcium, potassium, aluminum, sodium and ammonium compounds;

providing a rate controlled feed supply of dry additive used to promote at least one of the functions selected from the group consisting of promoting oxidation, enhancing chemical absorption of $SO_2$ from the flue gas provided to the absorber vessel, providing buffering and promoting crystallization to a pneumatic conveying pick-up point located within air supply piping used to provide an oxidation air stream from the oxidation air addition system into the absorber vessel;

controlling a feed rate of the dry additive to the pneumatic conveying pick-up point independently of a feed rate of the oxidation air stream into the absorber vessel;

using the oxidation air addition system air stream as the sole means of providing oxidation air oxidation air into the absorber vessel, and to pneumatically convey and inject the dry additive into the absorber vessel; and injecting the oxidation air stream, and the dry additive beneath a liquid surface level of the liquid slurry within the absorber vessel.

13. The method according to claim 12, wherein the dry additive is added in catalytic amounts to promote oxidation within the absorber vessel and is a member selected from the group consisting of compounds of iron, manganese, and vanadium.

14. The method according to claim 12, wherein the reagent is lime or limestone and the dry additive is a member selected from the group consisting of alkali compounds of magnesium, ammonium, potassium, calcium, and sodium.

15. The method according to claim 12, wherein the dry additive is a buffering agent for the desulfurization occurring within the absorber vessel and is a member selected from the group consisting of sodium formate, dibasic acid (DBA), sodium citrate, adipic acid, succinic acid, solid compounds of formic, acetic, hydroxypropionic, sulfosuccinic, adipic, phthalic, benzoic, fumaric, hydroxyacetic, succinic, and lactic acid.

16. The method according to claim 12, wherein the dry additive is added to inhibit oxidation to reduce scale growth within the absorber vessel and is a member selected from the group consisting of compounds of formate and thiosulfate and elemental sulfur.

17. The method according to claim 12, wherein the dry additive is polysulfonate.

* * * * *